(12) United States Patent
Kloepfer

(10) Patent No.: US 6,513,297 B2
(45) Date of Patent: *Feb. 4, 2003

(54) WALL CONSTRUCTIONS

(76) Inventor: Michael Kloepfer, R.R. #3, Delhi, Ontario (CA), N4B 2W6

( * ) Notice: Subject to any disclaimer, the term of this patent is extended or adjusted under 35 U.S.C. 154(b) by 0 days.

This patent is subject to a terminal disclaimer.

(21) Appl. No.: 10/163,773

(22) Filed: Jun. 5, 2002

(65) Prior Publication Data

US 2002/0190540 A1 Dec. 19, 2002

Related U.S. Application Data

(62) Division of application No. 09/754,705, filed on Jan. 4, 2001, now Pat. No. 6,425,626.

(51) Int. Cl.⁷ .............................. E04B 2/00; B60J 7/00
(52) U.S. Cl. ..................... 52/588.1; 52/586.1; 286/181; 286/191
(58) Field of Search ................................. 286/181, 191, 286/183, 36, 576, 43, 588.1; 52/239, 584.1, 582.1, 586.1; 229/149; 198/750; 220/1.5

(56) References Cited

U.S. PATENT DOCUMENTS

| | | | | |
|---|---|---|---|---|
| 3,043,407 A | * | 7/1962 | Marryatt | 52/588.1 |
| 3,100,556 A | * | 8/1963 | Ridder | 52/586.1 |
| 3,116,950 A | * | 1/1964 | Chieger et al. | 296/181 |
| 3,555,762 A | * | 1/1971 | Costanzo, Jr. | 52/588.1 |
| 3,638,384 A | * | 2/1972 | Martin | 52/592.1 |
| 3,886,705 A | * | 6/1975 | Cornland | 52/588.1 |
| 4,964,252 A | * | 10/1990 | Guliker | 52/275 |
| 5,403,062 A | * | 4/1995 | Sjostwedt et al. | 296/181 |
| 5,613,726 A | * | 3/1997 | Hobbs et al. | 296/181 |
| 5,681,095 A | * | 10/1997 | Martin | 296/191 |
| 5,730,485 A | * | 3/1998 | Sjostedt et al. | 296/191 |
| 5,791,726 A | * | 8/1998 | Kaufman | 296/181 |
| 5,934,741 A | * | 8/1999 | Beukers et al. | 296/181 |
| 6,135,531 A | * | 10/2000 | Allen et al. | 52/290 |
| 6,224,142 B1 | * | 5/2001 | McCormack | 42/586.1 |
| 6,425,626 B1 | * | 7/2002 | Kloepfer | 296/181 |
| 2001/0009085 A1 | * | 7/2001 | Boyer | 52/588.1 |
| 2001/0010139 A1 | * | 8/2001 | De Kerpel et al. | 52/582.1 |
| 2001/0021431 A1 | * | 9/2001 | Chen et al. | 428/54 |
| 2002/0041112 A1 | * | 4/2002 | Foster et al. | 296/181 |

* cited by examiner

*Primary Examiner*—Kiran Patel
(74) *Attorney, Agent, or Firm*—Delbert J. Barnard

(57) ABSTRACT

The sidewalls of a truck/trailer box are constructed from a plurality of panels (10, 12, 14) which are welded together where their vertical edges meet (82, 88, 90). The panels (10, 12, 14) are each extrusions and each includes thin side skins (24, 26 and 48, 50 and 56, 58) and thin webs (28, 52, 60). The top panel (10) may be formed to include an integral top rail (34). The bottom panel (14) may be formed to include one or two side rails (18, 18' and 120). The regions that need to be welded are made thick enough to be welded. Other regions are too thin to be welded. The overall construction is lightweight and quite strong and facilitates construction of the truck/trailer box.

7 Claims, 5 Drawing Sheets

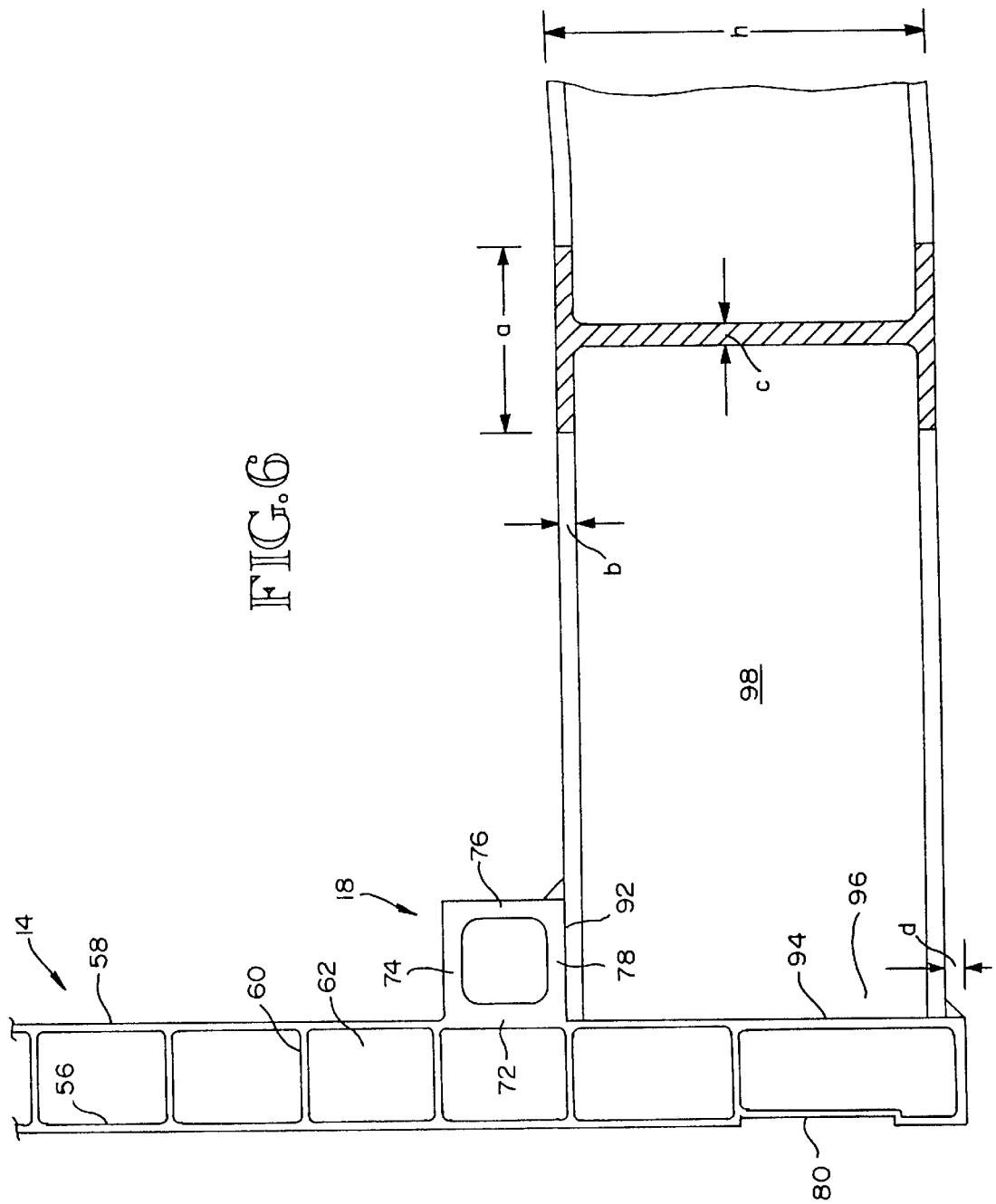

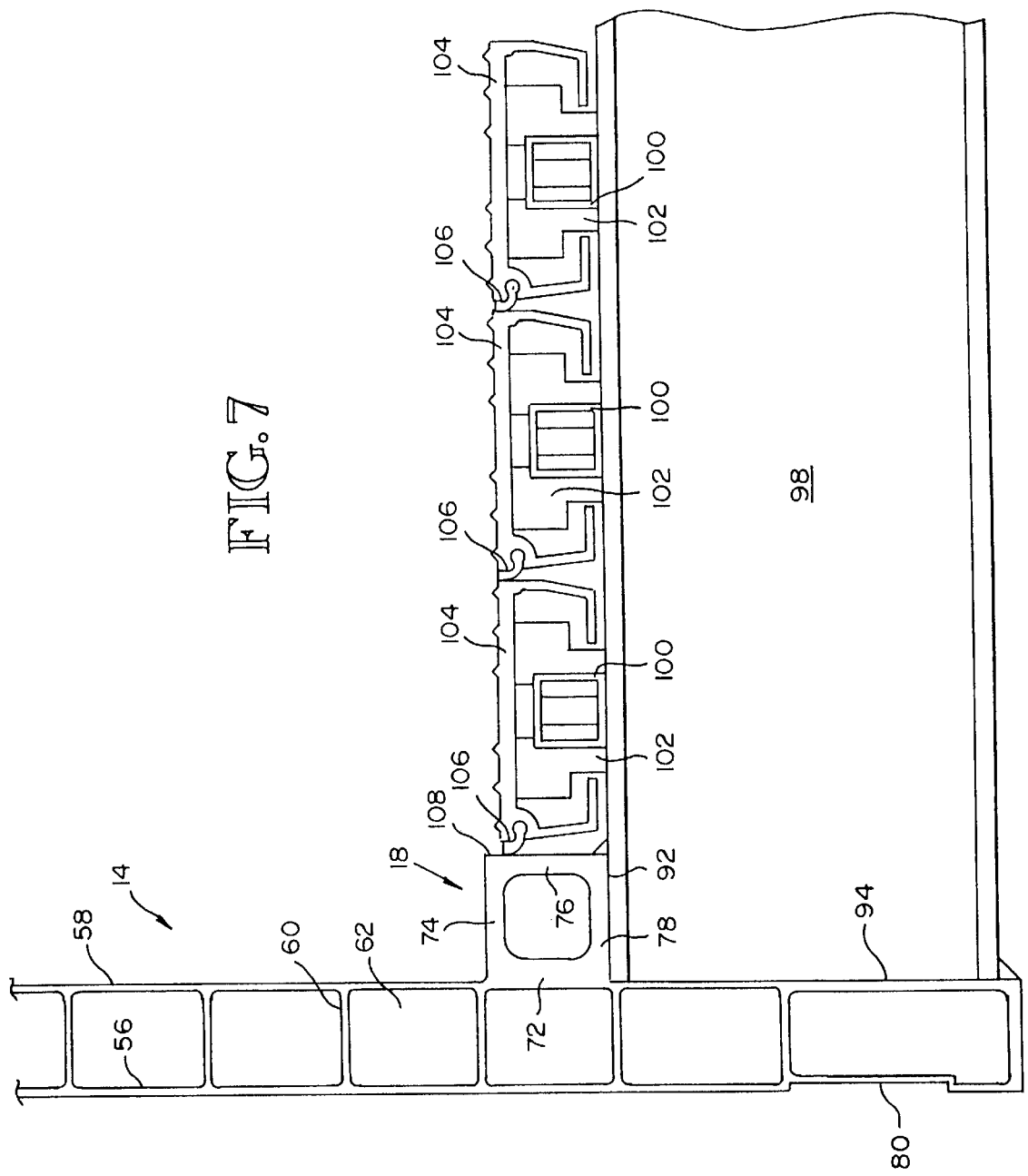

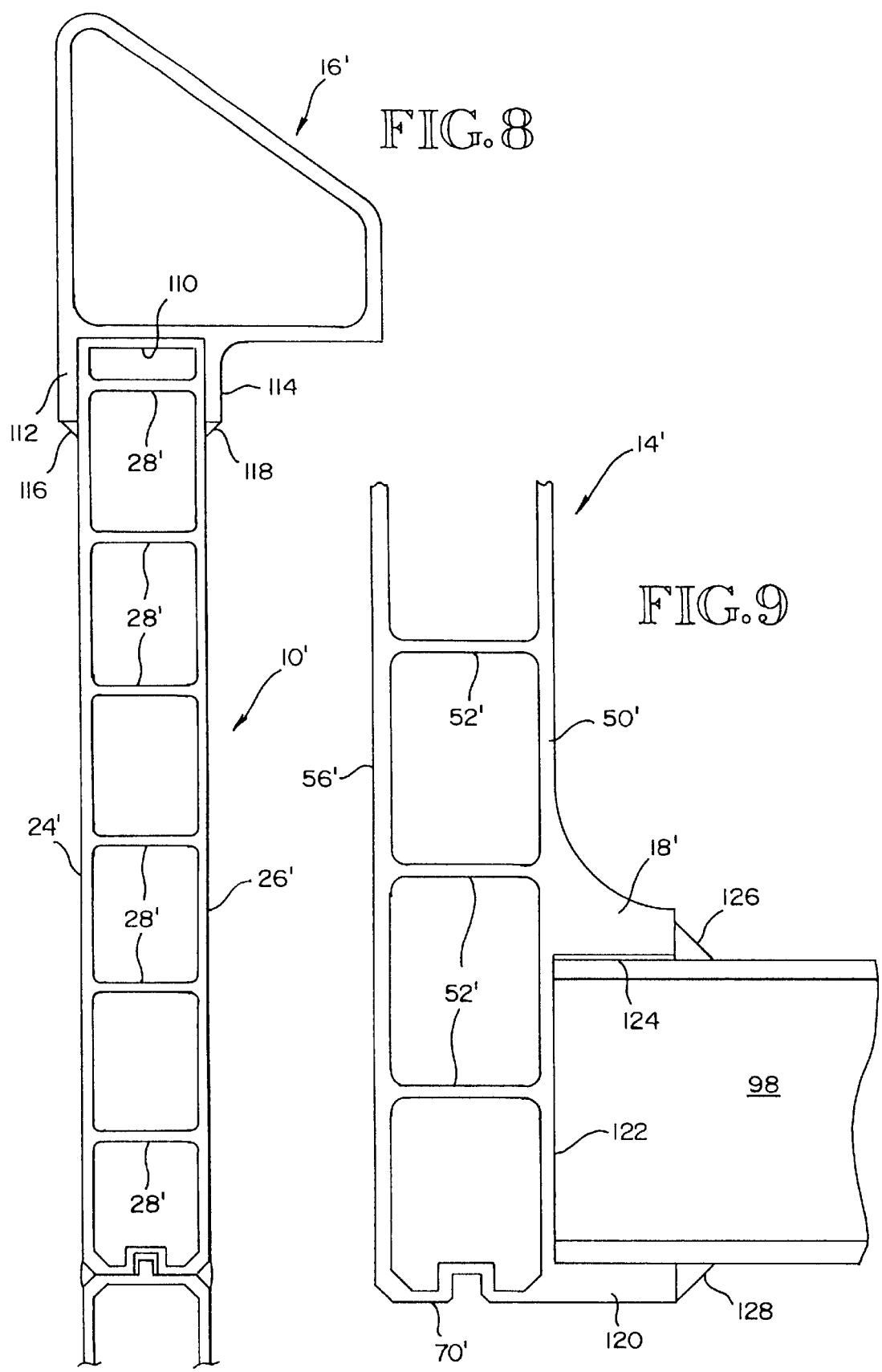

WALL CONSTRUCTIONS

RELATED APPLICATIONS

This application is a divisional of my application Ser. No. 09/754,705, filed Jan. 4, 2001 now U.S. Pat. No. 6,425,626, and entitled "Truck/Trailer Box Construction".

TECHNICAL FIELD

This invention relates to truck/trailer box constructions. More particularly, it relates to a sidewall construction for a truck/trailer box that is basically characterized by a plurality of horizontally elongated sidewall panels each composed of skins and webs that are too thin to be welded, and to a joint construction that permits the sidewall panels to be welded together where they join.

BACKGROUND OF THE INVENTION

There is a need for a way of constructing the sidewalls of truck/trailer boxes from materials that are very light weight but strong and rigid. There is also a need for such a truck/trailer box construction that permits sections of a sidewall to be welded together while still allowing for the use of very thin skins and webs that are themselves too thin to be welded.

There is also a need for a truck/trailer box sidewall construction that provides for the easy manufacture of both a top rail and a bottom rail for adding strength and rigidity to the tops and bottoms of the sidewalls.

The principal object of the present invention is to provide a truck/trailer sidewall construction that meets the above needs. Regarding the prior art, U.S. Pat. No. 5,052,741, granted Oct. 1, 1991, to Raynard Brown and Norval I. Lopshire discloses a truck box that is composed of a plurality of sidewall panels and an interlocking joint structure where edges of the panels meet. In the Background of the Invention portion of this patent, there is reference to the more common truck body sidewalls that are formed from plywood covered with an aluminum or plastic exterior surface. U.S. Pat. No. 5,791,726, granted Aug. 11, 1998, to Thomas N. Kaufman discloses a livestock trailer having sidewalls that are constructed from aluminum tubular members. The Background of the Invention section of this patent discloses and discusses several prior art trailers.

U.S. Pat. No. 4,785,929, granted Nov. 22, 1988, to Raymond K. Foster, and U.S. Pat. No. 5,096,356, granted Mar. 17, 1992, also to Raymond K. Foster disclose bottom constructions for truck/trailer boxes. The truck/trailer box sidewalls of the present invention are particularly adapted for use with the bottom constructions disclosed by these patents.

BRIEF SUMMARY OF THE INVENTION

The present invention includes providing a truck/trailer box sidewall construction that is characterized by a horizontally elongated bottom sidewall panel having a top edge, a bottom edge, inside and outside, vertical side skins, and a plurality of vertically spaced apart, horizontal webs interconnecting the side skins vertically between the top and bottom edges. The side skins and the webs together define a plurality of horizontally elongated inner spaces in said bottom sidewall panel. Each inner space is defined horizontally between the two side skins and vertically between the two webs. A horizontally elongated side rail may extend laterally outwardly from the inside skin of the sidewall at a location spaced above the bottom edge. The side rail has a bottom surface that forms a nook with a lower side surface of the inside side skin that extends downwardly from the bottom surface of the side rail. The top and bottom edges, the inside and outside vertical side skins, the horizontal webs and the side rail are all portions of a common extrusion.

According to another aspect of the invention, the truck/trailer sidewall further comprises a horizontally elongated top sidewall panel and a plurality of horizontally elongated intermediate sidewall panels. The intermediate sidewall panels are positioned vertically between the top sidewall panel and the bottom sidewall panel. The top sidewall panel has a top portion, a bottom edge, inside and outside vertical side skins, and a plurality of vertically spaced apart horizontal webs interconnecting the vertical side skins. The intermediate sidewall panels have top and bottom edges, inside and outside vertical side skins, and a plurality of vertically spaced apart horizontal webs interconnecting the vertical side skins. The bottom edge of the top sidewall panel is connected to the top edge of an adjacent intermediate wall panel that is below it. The top edge of the bottom wall panel is connected to the bottom edge of an adjacent intermediate sidewall panel that is above it. All other intermediate wall panels are connected to edges of the wall panel that is above it and the wall panel that is below it. When the top sidewall panel, the bottom sidewall panel and the intermediate sidewall panels are all connected together, the outside vertical side skins of all of said panels are substantially coplanar and the inside vertical side skins of all of said wall panels are substantially coplanar.

A further aspect of the invention is to provide a side rail that is integral with the inside side skin of the bottom sidewall panel. This sidewall projects laterally from the inside, vertical side skin.

The present invention also includes providing a truck/trailer box sidewall construction that comprises a horizontally elongated top sidewall panel having a top portion, a bottom edge, inside and outside, vertical side skins, and a plurality of vertically spaced apart, horizontal webs interconnecting the side skins vertically between the top portion and the bottom edge. The side skins and webs together define a plurality of horizontally elongated inner spaces in said top sidewall panel. Each said inner space is defined horizontally between the two side skins and vertically between two webs. The top portion of the top sidewall panel includes a top rail extending longitudinally of the top sidewall panel. The top edge rail is wider than the top sidewall panel and includes a vertical outside skin, a vertical inside skin, a top skin and a bottom skin, and at least one web extending between the side skins and dividing the top rail into inner spaces. The top rail and the bottom edge of the top sidewall panel, and the inside and outside vertical side skins, and the top and bottom skins of the top rail, and the horizontal webs in the top sidewall panel, and in the top rail, are all portions of a common extrusion.

The present invention further includes providing a truck/trailer box sidewall construction that is characterized by a lower, horizontally elongated, first sidewall panel and an upper, horizontally elongated second sidewall panel. The first sidewall panel has a top edge, vertical inside and outside side skins, and vertically spaced apart horizontal webs interconnecting the side skins vertically below the top edge and horizontally between the two side skins. The second sidewall panel has a lower edge, vertical inside and outside side skins, and horizontal webs interconnecting the side skins together vertically above the bottom edge and horizontally between the two side skins. The inside and outside skins of the first and second sidewall panels are too thin to be welded. One of the top and bottom edges includes a longitudinal groove and the other includes a longitudinal tongue that extends into the groove when the top and bottom edges are in contact. The first sidewall panel has corner regions that extend diagonally between the side skins and the top edge of the first wall section. The second sidewall panel has corner regions that extend diagonally between the side skins of the second sidewall section and the bottom edge of the second sidewall section. The corner regions together form horizontally extending weld recesses where the corner regions of the first sidewall panel adjoin the corner regions of the second sidewall panel when the top and bottom edges are in contact. The corner regions of the first and second sidewall panels are thick enough at the weld recesses to permit the placement of weld beads in the weld recesses. Weld beads are placed in the weld recesses and serve to weld the upper edge of the first sidewall panel to the lower edge of the second sidewall panel.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 6 is an enlarged scale fragmentary view of the lower portion of FIG. 3, showing an end portion of a transverse beam that extends cross the full width of the trailer and connects to the lower regions of the bottom sidewall panel sections of the trailer;

FIG. 7 is a view like FIG. 6, showing a reciprocating slat conveyor installed on the transverse beams, and further showing a relationship between an outside conveyor slat and the side rail that is a part of the extrusion that forms the bottom sidewall panel sections of the trailer sidewall;

FIG. 8 is an end elevational view of a modified top sidewall panel showing a top rail extrusion that is separate from the extrusion that forms the top sidewall panel; and FIG. 9 is a view like FIG. 6, but showing a modified construction of the side rail, and showing the bottom sidewall panel section further including a bottom flange that is vertically spaced from the side rail, so as to define an elongated channel in which an end portion of a cross frame member, or a trailer floor section is received.

DETAILED DESCRIPTION OF THE INVENTION

Figure 2:
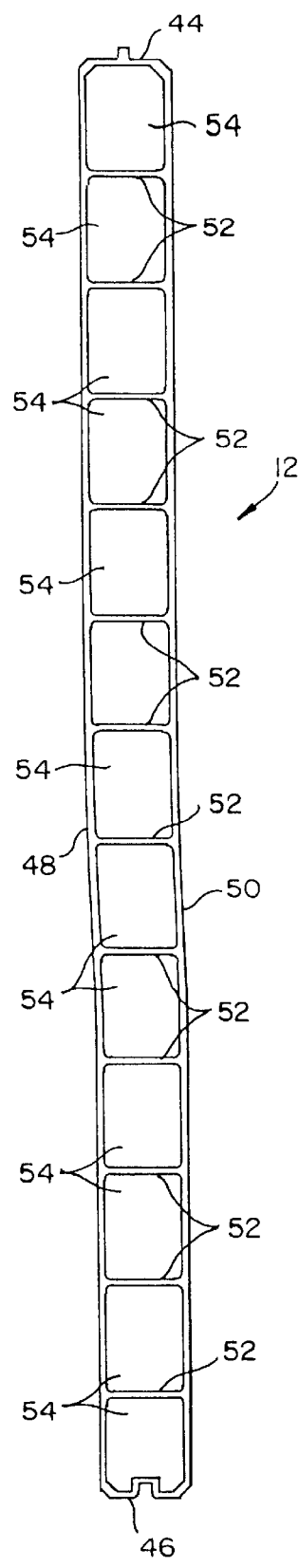
FIG. 2 is an end elevational view of a second extrusion that forms an intermediate wall panel section of the trailer sidewall.
Figure 3:
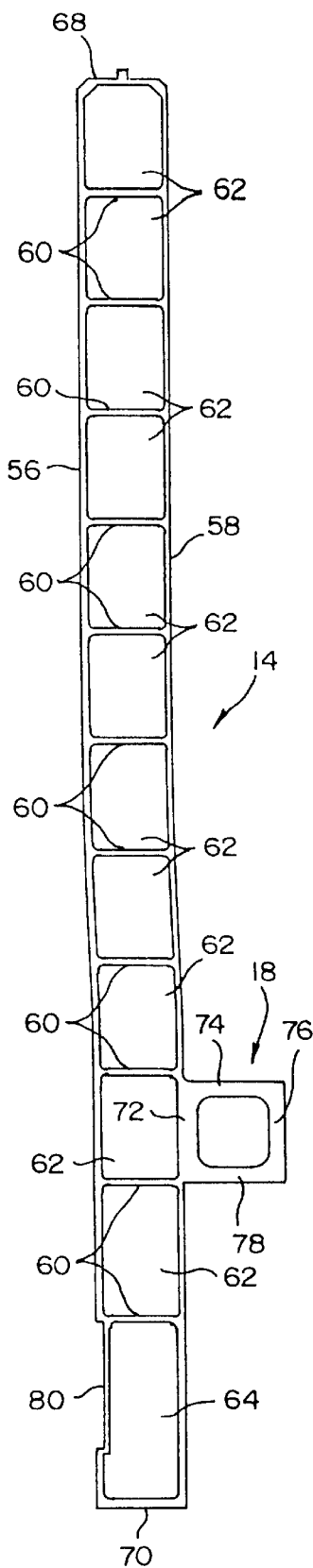
FIG. 3 is an end elevational view of a third extrusion that forms a bottom wall panel section of a trailer sidewall.
Figure 4:
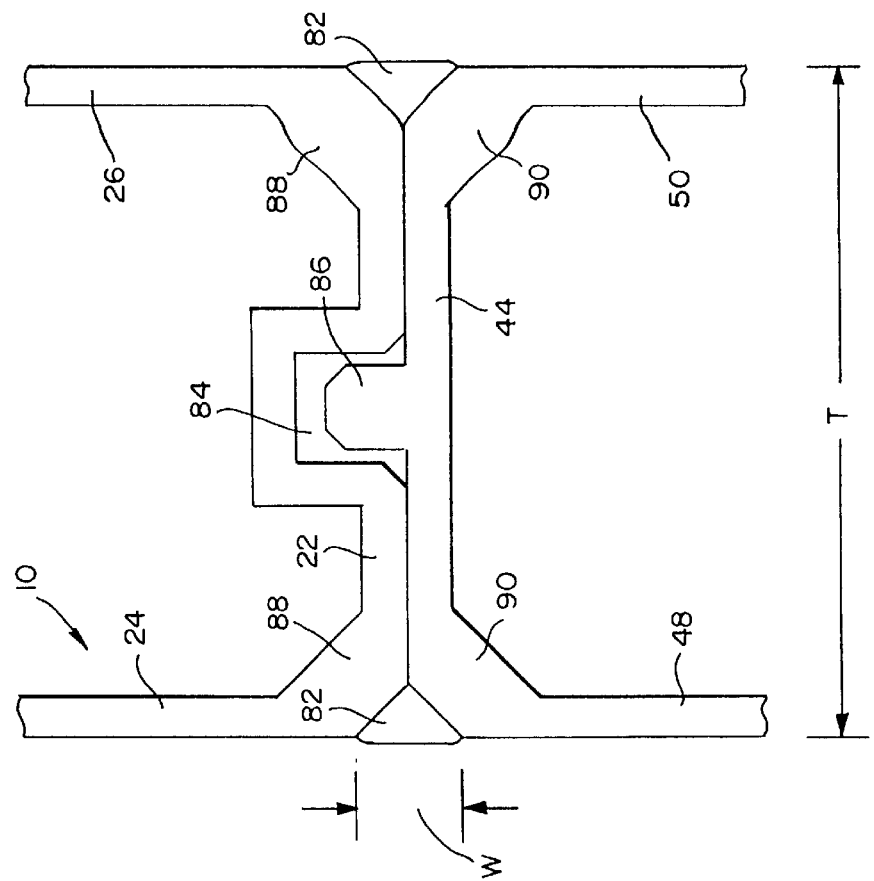
FIG. 4 is an enlarged scale end elevational view showing the top edge portion of a lower wall panel spaced form a bottom edge portion of an adjacent upper wall panel.

FIG. 2 of the aforementioned U.S. Pat. No. 5,096,354 shows a reciprocating slat conveyor forming a floor in a material receiving compartment of a trailer box (TB). The trailer box (TB)is shown to have a pair of sidewalls (14, 16), a forward wall (18), a rear wall (20) and a floor or bottom (10). The rear wall (20)is formed of a door or a pair of doors. The floor (10) is shown to include transverse beams (36) on which the conveyor components rest. In FIGS. 2, 3 and 6, the illustrated transverse beams are I-beams (36). The construction of the sidewalls is not disclosed and does not matter in that patent.

Figure 1:
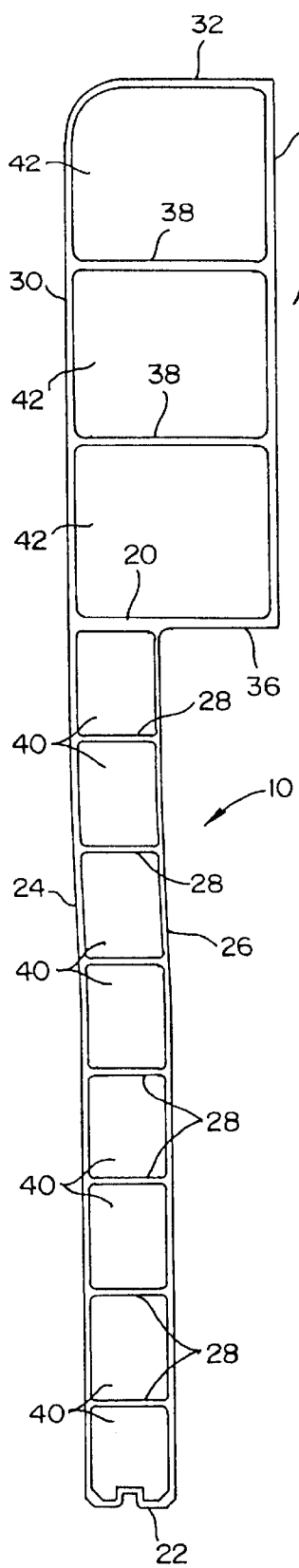
FIG. 1 is an end elevational view of a first extrusion that forms a top wall panel section of a trailer sidewall.

FIGS. 1–3 show components for making the sidewalls of a trailer box or similar container or compartment. Element 10 shown in FIG. 1 is a top panel section for a sidewall. Element 12 shown in FIG. 2 is an intermediate panel section. Element 14 shown in FIG. 3 is a bottom panel section. A typical sidewall is formed by one top panel section 10, three intermediate panel sections 12 and one bottom panel section 14. The second sidewall can be formed by the same panel sections 10, 12, 14. However, the top panel section 10 and the bottom panel section 14 would have to be turned end to end so that the top rail on top panel section 10 is projecting inwardly and the side rail 18 on bottom panel section 14 is directed inwardly. Because of the sidewall construction, it is only necessary to show one top panel section 10, one intermediate panel section 12 and one bottom panel section 14. When the two sidewalls are assembled, each is a mirror image of the other.

Top panel section 10 includes a top edge 20 that forms a part of the bottom or base of the top rail 16. It further includes a bottom edge 22, a pair of laterally spaced apart side skins 24, 26 and a plurality of horizontal webs 28. The top rail 16 includes an outside skin 30, a top skin 32, an inside skin 34, and a bottom skin 36 and one or two webs 38. All portions of the top panel section 10 are horizontally elongated, preferably for the full length of the trailer. The top edge 20, a substantial portion of the bottom edge 22, skins 32, 36 and the webs 28, 38 all extend horizontally. The side skins 24, 26, 30, 34 extend vertically. As clearly shown by FIG. 1, outside skins 24, 20 are different sections of a continuous single skin that extends from the bottom edge 22 up to the top skin 32. Inside skin 34 is offset outwardly from inside skin 36. Webs 28 and edge walls 20, 22 divide the space that is laterally between the side skins 24, 26 into horizontally elongated spaces 40. Webs 38 define the space that is laterally between skins 30, 32 into three spaces 42. Spaces 40, 42 are horizontally elongated spaces. As previously described, the top panel section 10 is a one-piece extrusion. It is preferably formed from a metal that is predominately aluminum.

The intermediate panel section 12 is also a one-piece extrusion. It has an upper edge wall 44, a lower edge wall 46, an outside skin 48, an inside skin 50 and a plurality of webs 52. Webs 52 divide the space that is laterally between skins 48, 50 into smaller spaces 54. Side skins 48, 50 are parallel to each other in separate vertical planes. The webs 52 are parallel to each other in separate horizontal planes.

Bottom panel section 14 is also a continuous single piece extrusion. It is formed of outside and inside skins 56, 58 that are in separate, parallel vertical planes. The space between the skins 56, 58 is divided into smaller spaces by horizontal webs 60. Webs 60 divide the larger space into smaller spaces or cells 62. Bottom panel section 14 includes a top edge wall 66 and a bottom edge wall 70. It also includes the aforementioned side rail 18. In this embodiment, the side rail 18 has an inner wall 72 that includes the inside skin 58 plus some additional thickness. It also includes a top wall 74, an inside wall 76, and a bottom wall 78. Walls 74, 76, 78 are substantially equal in thickness. Wall 72 has a thickness that is substantially the sum of the thickness of walls 76 and the skin 58.

Near the bottom of the bottom panel section 14, the outside skin 56 includes a recess 80. Because the bottom panel section 14 is formed by extrusion, it is easy to provide the recess 80 and the side rail 18 to the rest of the extrusion. The recess 80 extends the full length of the bottom panel section 14. A conspicuity tape is received within the recess 80.

The sidewall panel sections 10, 12, 14 are connected together by weld beads 82, one on each side of the sidewall. By way of example, the thickness dimension T for the top panel section 10, below the top rail 16, the entire intermediate panel section 12, and the bottom panel section 14, except at the side rail 18 and at the recess 80 may be substantially about 1½ inches. The skins 24, 26, 30, 48, 50, 56, 58 and webs 28, 52, 60 may be substantially about 0.09 inches thick. The center-to-center dimension between adjacent webs 28, 52, 60 may be substantially about 1.763 inches. An important dimension is the thickness Z in the region of the welds 82. In the example, this thickness is substantially about 0.188 inches. The weld recess width W is substantially about 0.250 inches. The weld recess depth D is substantially about 0.125 inches.

Figure 5:
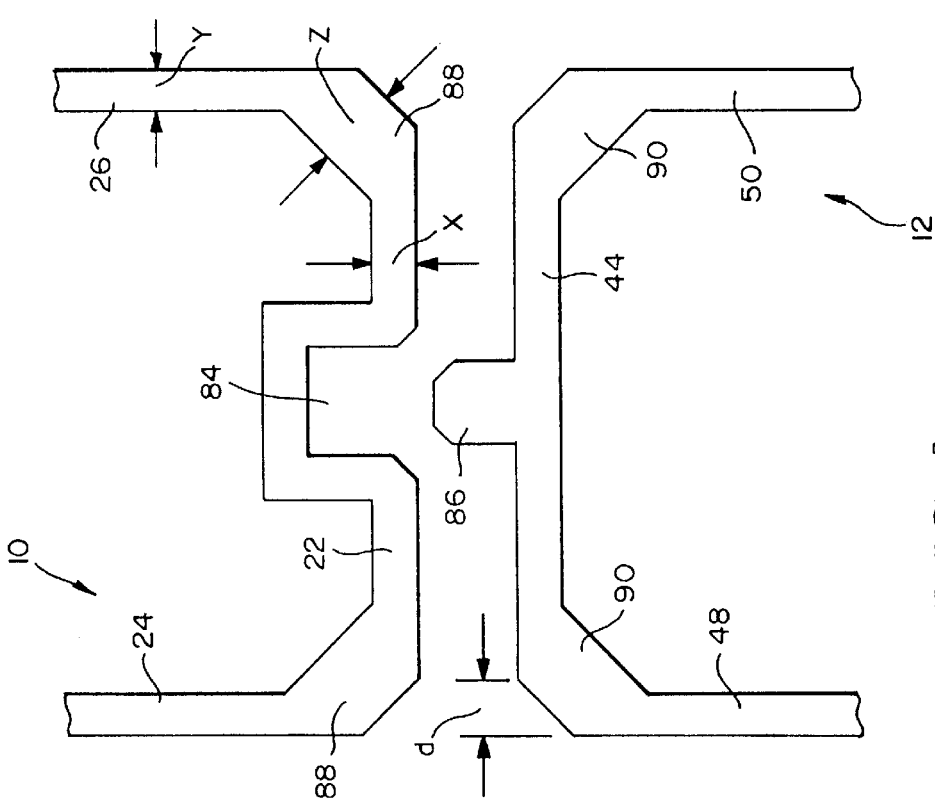
FIG. 5 is a view like FIG. 4, but showing the two edge portions of the wall panels together and further showing welds connecting the wall panel sections together where they meet.

In preferred construction, the lower edge walls 22, 46 are formed to include a longitudinally extending groove 84. The top edges 44, 68 are provided with a complementary longitudinally extending tongue 86. As shown by FIG. 5, the tongue 86 makes a loose fit with the groove 84. In the given example, the tongue width may be substantially about 0.1875 inches. The groove width may be substantially about 0.25 inches. The tongue length may be about 0.1825 inches. The groove depth may be substantially about 0.2475 inches. During assembly, two panel sections to be joined are brought together. The tongue 86 on one is inserted into the groove 84 in the other. Then, the side planes of the two panel sections are put into substantial coplanar alignment and the weld beads 82 are placed within the weld recess W, D. The tongue and groove components facilitate the welding process. If they were not present when the panels were welded together, the panels would expand and contract and become "wavy" down the length of the side. This would make it impossible to weld properly. It would be possible to "tack" weld every twelve inches on one side, but this would be impractical. The invention includes any type of tongue and groove system that holds the panels parallel to each other for welding purposes. For example, a two tongue and two groove system could be used.

At each joint, the diagonal corner regions 88, 90 provide both structural reinforcement and width and depth for the weld beads W. A weld bead 82 that is substantially triangular in cross section, substantially about 0.250 inches wide, and substantially about 0.125 inches deep is made possible because of the thickness of the material in regions 88, 90. The corner regions 88, 90 and the weld beads 82 together form outwardly widening flanges that, together with the wall sections 22, 44 provide a reinforcing beam section at the location of each joint. This beam section extends the full length of the joint and its parts 22, 44, 82, 88, 90 in effect form I-beam like longitudinal stiffening and strengthening ribs at each joint location.

The panels 10, 12, 14 that make up a sidewall are laid flat on a jig. They are clamped and then tack welded about every four feet on the underneath side. They are no tack welds on the top. Then, all panels are welded the full length of the wall, simultaneously. The wall forming panel assembly is then flipped over to position its welded side facing downwardly. The wall structure is then clamped down and the new "up" side is welded the full length, simultaneously.

In the stated example, the width of top rail 16 may be substantially about 3.5 inches. The depth dimension, from the top of skin 32 to the bottom of skin 36 may measure substantially about 9.149 inches. The width dimension of skins 32, 34, 36 may be substantially about 0.1495 inches.

Referring to FIGS. 6 and 7, in the given example, the width and height outside dimensions of the side rail 18 may be substantially about 1.75 inches. Side rail 18 includes a bottom surface 92 that is substantially perpendicular to the side surface 94 of the bottom panel section 14. The bottom surface 92 and the side surface 94 together form a substantially right angle "nook" in which end portions 96 of transverse frame beams 98 are received. In a manner known per se, the transverse beams 98 are parallel to each other and are spaced apart longitudinally of the trailer. In accordance with an aspect of the present invention, the end portions 96 of the beams 98 are welded to the side rail 18 and the lower portion of the bottom panel section 14 that depends downwardly from the side rail 18. In the given example, the height dimensions H of the beams 98 is substantially about 5.25 inches. The flanged width a is substantially about 2 inches. The flange and web thicknesses b, c, is substantially about 0.25 inches. In the given example, the dimension d between the lower surface of the lower flange of beam 98 and the lower surface 70 of bottom panel section 14 is substantially about 0.25 inches. To a certain extent, the inside and outside skins of the first and second sidewall panels are too thin to be welded. They can be welded across the ribs but suffer stress cracking when welded along the ribs.

FIG. 7 shows a reciprocating slat conveyor mounted on the floor beams 98. Longitudinal guide a support beams 100 are welded to the top flanges of the beams 98. See also, for example, FIG. 11 of U.S. Pat. No. 4,785,929. Self-lubricated plastic bearings 102 are positioned on the beams 100. Elongated conveyor slats 104 are positioned on the bearings 102. The floor slats 104 are reciprocated lengthwise of the beams 100. For example, they are all moved in unison from the front to the rear of the truck/trailer box. They are then stopped and are retracted, one third at a time. That is, slats 1, 4, 7, etc. are retracted while the remaining slats remain stationary. Then, slats 2, 5, 8, etc. are retracted while the others slats are stationary. Then, slats 3, 6, 9, etc. are retracted while the other slats are stationary. Then, the cycle is repeated.

The conveyor slats 104 carry seal members 106. The inside seal members 106 make a sliding sealing contact with an opposing side portion of an adjacent conveyor slat 104. On the two sides of the conveyor, the seal strips 106 make sliding sealing contact with a surface 108 that is the inside vertical face of the side rail 18. In the system shown by FIG. 7, the floor slat 104 that is adjacent the side rail 18 at the opposite side of the truck/trailer box includes two seal strips 106. The inside seal strip 106 contacts a confronting surface of the next conveyor slat 104 that is to its inside. The outside seal strip 106 makes sealing contact with a side rail 18 that is like side rail 18 shown in FIG. 7, but projecting inwardly from the bottom sidewall panel 14 that is on the opposite side of the truck/trailer box.

As shown by FIG. 7, the skin portion 94 is thicker than the skin portions 56, 58. It is thick enough to allow the end portion of beams 98 to be welded to the skin portions 94. The side rail 104 is also made thick enough so that it can welded to the top flanges of the transverse beams 98.

FIG. 8 shows an alternate construction of the top panel 10'. Panel 10' includes outer and inner skins 24', 26' and webs 28'. In this embodiment, the top rail 16' is a separate extrusion from the remainder of the top panel 10'. It is formed to include a downwardly opening longitudinal channel 110 formed by and between side members 112, 114. The upper edge portion of the top panel 10' fits in the channel 110 and is welded to the flanges 112, 114 at 116, 118.

FIG. 9 shows a modified construction of the bottom panel 14'. It has vertically spaced apart upper and lower side rails 18', 120. The side rails 18', 120 and wall portion 122 together form inwardly opening longitudinal channels 12 in which end portions of the floor beams 98 are received. The floor beams 98 may be welded to the side rails 18', 120 at 126, 128.

Other floor constructions are within the scope of the present invention. For example, the floor structure may itself be formed by a plurality of joined together panels or extrusions, for example. Other floor constructions could be used as well.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A wall construction, comprising:

an elongated, first wall panel having a first panel edge, inside and outside side skins, and spaced apart internal webs interconnecting the side skins;

an elongated, second wall panel having a second panel edge, inside and outside side skins, and spaced apart internal webs interconnecting the side skins;

one of said first panel edge and said second panel edge including a longitudinal groove and the other including a longitudinal tongue that extends into the groove when the edges are together;

said first wall panel having corner regions that extend between the side skins and the first panel edge; said second wall panel having corner portions that extend between the side skins and the second panel edge;

said corner regions together forming longitudinally extending weld recesses where the corner regions of the first wall panel adjoin the corner regions of the second wall panel when the panel edges are together; and weld beads in the weld recesses welding the first panel edge of the first wall panel to the second panel edge of the second wall panel.

2. The wall construction of claim 1, wherein the first panel is an extrusion.

3. The wall construction of claim 1, wherein the second panel is an extrusion.

4. The wall construction of claim 3, wherein the first panel is an extrusion.

5. The wall construction of claim 1, wherein the corner regions are thicker than the side skins.

6. The wall construction of claim 1, wherein the first and second panels extend horizontally.

7. The wall construction of claim 1, wherein the panels are substantially flat.

* * * * *